May 26, 1925.  1,539,187
E. M. HEWLETT ET AL
MEANS FOR REPRODUCING POSITION
Filed Dec. 27, 1921
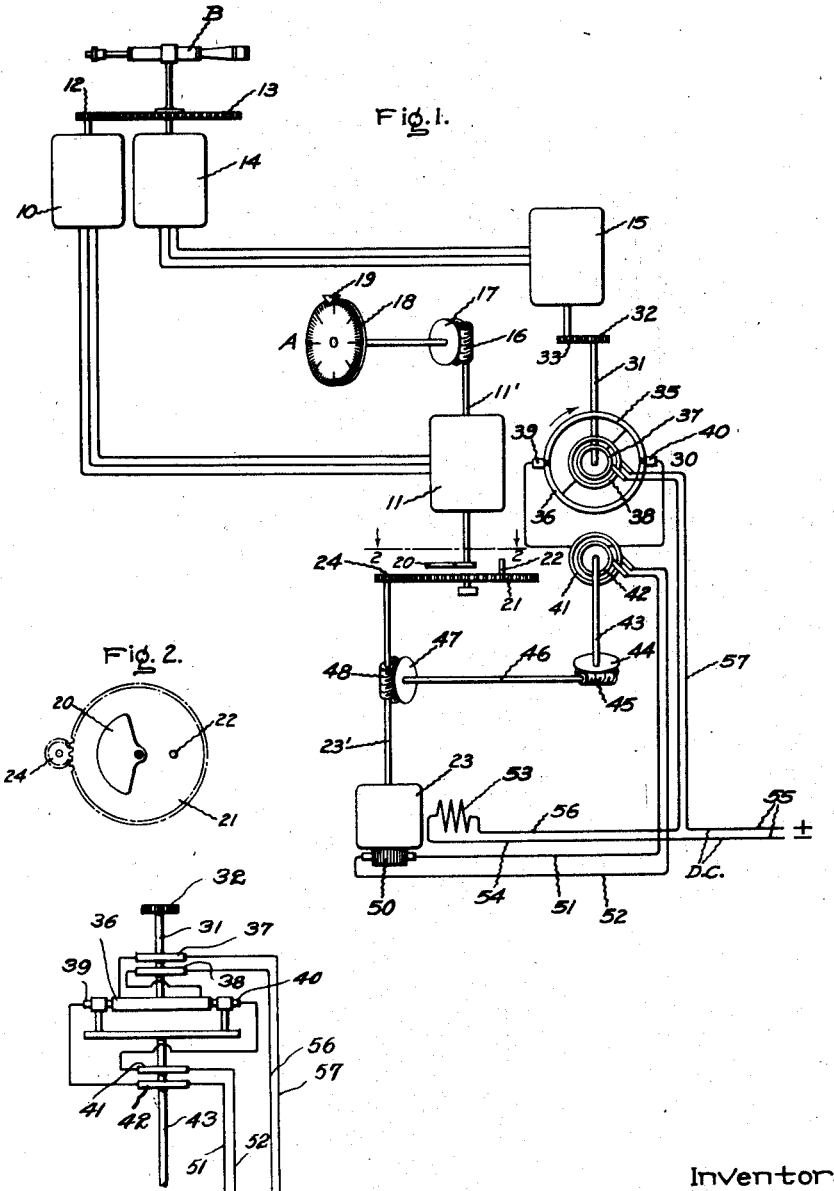
Inventors:
Edward M. Hewlett,
Waldo W. Willard,
by
Their Attorney.

Patented May 26, 1925.

1,539,187

UNITED STATES PATENT OFFICE.

EDWARD M. HEWLETT AND WALDO W. WILLARD, OF SCHENECTADY, NEW YORK, ASSIGNORS TO GENERAL ELECTRIC COMPANY, A CORPORATION OF NEW YORK.

MEANS FOR REPRODUCING POSITION.

Application filed December 27, 1921. Serial No. 524,882.

*To all whom it may concern:*

Be it known that we, EDWARD M. HEWLETT and WALDO W. WILLARD, citizens of the United States, residing at Schenectady, in the county of Schenectady, State of New York, have invented certain new and useful Improvements in Means for Reproducing Position, of which the following is a specification.

This invention relates to means for reproducing position and has for its object the provision of improved means for driving an object into positional agreement with another object.

More specifically this invention relates to systems for driving one object in response to movement of another of the type disclosed in our copending application, Serial No. 501,006, filed Sept. 15, 1921, and assigned to the same assignee as this invention. In systems of this type, the movement of a controlling object, such as a telescope, is transmitted for the control of a driven object, such as an indicator, by means of coarse and fine systems for the transmission of angular motion. The driven object is adjusted roughly in accordance with the reproducer of the coarse system and accurately in accordance with the reproducer of the fine system into positional agreement with the controlling object. In our aforesaid application we have shown the driven object as actuated by an electric motor which is controlled successively by the coarse and fine reproducers.

In the use of both coarse and fine systems for transmitting angular motion, the coarse system is provided to bring the driven object into positional agreement with the controlling object with an accuracy sufficient to make the fine reproducer available for the final accurate adjustment. The coarse reproducer is made necessary by the fact that the reproducers move into angular agreement with their transmitters by the shortest path and without taking into account any whole revolutions through which the transmitters may have been previously turned. The coarse reproducer, therefore, adjusts the driven object in accordance with the number of whole revolutions that the fine reproducer should make, the fine reproducer making the accurate adjustment by moving into agreement with its transmitter in the correct final revolution.

In carrying out our present invention, we control an electric motor by a reproducer preferably by a coarse reproducer.

In one embodiment of our present invention, we drive the driven object by the fine reproducer and cause the fine reproducer to make the correct number of whole revolutions by means of an electric motor which is controlled by a coarse reproducer responsive to movement of the controlling object. The fine reproducer is maintained free in its final revolution and completes the accurate adjustment of the driven object into positional agreement with the controlling object independently of the electric motor in this final revolution. We have thus provided means controlled by the coarse reproducer for determining the number of whole revolutions of the fine reproducer, but leaving the fine reproducer free in its final revolution to move the driven object into positional agreement with the controlling object.

For a more complete understanding of our invention, reference should be had to the accompanying drawing in which Fig. 1 shows diagrammatically a system for reproducing angular movement embodying our invention; Fig. 2 is a section view along the line 2—2 of Fig. 1 looking in the direction of the arrows; while Fig. 3 is a fragmentary plan view showing the motor control means.

Referring to the drawing, in one embodiment of our invention an indicator A is moved in accordance with movement of a remote telescope B so as to always indicate the angular position of the telescope. Movement of the telescope B is transmitted for the control of the indicator A by means of suitable coarse and fine systems for the transmission of angular motion. In this embodiment of our invention we have shown the selsyn systems disclosed in our aforesaid copending application. The fine system comprises a selsyn generator or transmitter 10 electrically connected to which is a selsyn receiving motor or reproducer 11. The selsyn transmitter 10 is operated at high speed with respect to the telescope B, such as at a ratio of 72—1. It is driven by means of a pinion 12 on its driving shaft which meshes with a spur gear 13 secured to the telescope. The coarse system comprises a selsyn generator or transmitter 14 electrically connected to which is a selsyn receiving motor or reproducer 15. The transmitter 14 is connected to the telescope so as to be driven at a low speed ratio such as 1—1 with the telescope. As shown in the drawing, the shaft of transmitter 14 is direct connected to the telescope.

The fine reproducer 11 is operatively connected to drive the indicator A by means of a worm 16 on the shaft 11' of the reproducer which meshes with the worm gear 17 on the driving shaft of the indicator. The ratio of gears 16 and 17 is such that the indicator is driven at a 1—1 ratio with the telescope B. The indicator consists of a movable dial 18, suitably calibrated, cooperating with which is a stationary pointer 19. The stationary pointer indicates on the dial the angular position of the telescope.

On the opposite end of the driving shaft 11' of transmitter 11 is secured an arm 20. Preferably arm 20 is in the form of a sector. A spur gear 21 is secured adjacent arm 20 so as to move about an axis which is coincident with the axis of shaft 11'. On the spur gear 21 is a projection or pin 22 which is adapted to engage arm 20 upon relative movement of arm 20 and gear 21. Projection 22 normally is approximately diametrically opposite arm 20. Gear 21 is driven by a series electric motor 23 by means of a pinion 24 meshing therewith and secured to the driving shaft 23' of the motor.

The electric motor 23 is controlled by the coarse reproducer 15 in response to movement of the telescope B. The control of motor 23 is accomplished by means of a commutator 30 mounted on a shaft 31 which is driven by reproducer 15 at one half its own speed by means of gears 32 and 33. The commutator 30 comprises two insulated 180° conducting segments 35 and 36 which are electrically connected to slip rings 37 and 38, respectively. Cooperating with the segments of the commutator are brushes 39 and 40 which are positioned diametrically opposite each other on the commutator. These brushes are slightly wider than the insulating segments between the conducting segments 35 and 36 of the commutator, and are adapted therefore to short circuit the conducting segments when in the positions shown in the drawing. Brushes 39 and 40 are electrically connected to slip rings 41 and 42, respectively, and the brushes and the slip rings are mechanically connected to a driving shaft 43, as shown in Fig. 3, so as to be driven by the shaft with relation to the commutator. Shaft 43 is driven at slow speed by motor 23 through a gear train comprising a worm gear 44 secured to shaft 43 and meshing with a worm 45 on a transmission shaft 46, the transmission shaft having a worm gear 47 meshing with a worm 48 on shaft 23' of the motor. The speed ratio between gear 21 and shaft 43 is equal to twice the ratio between reproducers 11 and 15.

Motor 23 has its armature 50 electrically connected through conductors 51 and 52 and suitable brushes to the slip rings 41 and 42. The series field winding 53 of the motor is connected through conductor 54 to one side of a suitable source of direct current supply 55, and through a conductor 56 and a suitable brush to slip ring 37. It is provided with sufficient resistance to allow its being connected directly across the supply source. The opposite side of supply source 55 is connected through conductor 57 and a suitable brush to slip ring 38.

As thus constructed and arranged the operation of our invention is as follows: with the indicator A in position to indicate correctly the position of the telescope B, as shown in the drawings, the commutator device 30 and brushes 39 and 40 are in such relative positions that the brushes bridge the insulating segments, short circuiting armature 50 of the motor 23. Under these conditions the motor is at rest, its field winding 53 being connected directly across the source of electrical supply 55. Upon the movement of the telescope B, transmitters 10 and 14 are actuated in their respective ratios. The movement imparted to transmitter 14 is repeated by reproducer 15, which drives commutator 30. Reproducer 11 repeats the movement imparted to transmitter 10 upon movement of the telescope, driving indicator A in a direction corresponding to the movement of the telescope and moving arm 20 toward pin 22. Assuming that the telescope is moved in a direction to cause the commutator to be moved in a clockwise direction, as indicated by the arrow, commutator segment 35 is moved out of engagement with brush 39, while segment 36 is moved out of engagement with brush 40. This opens the short circuit for armature 50, establishing a circuit from supply source 55 through conductor 57 to collector ring 38, thence to commutator segment 36 by way of brush 39 to collector ring 41, thence through conductor 52, armature 50, conductor 51, and collector ring 42 to brush 40, and thence to commutator segment 35, collector ring 37, and through conductor 56, series field winding 53 and conductor 54 back to the supply source 55. The motor 23 thereupon starts up and operates in a direction to move brushes 39 and 40 in the same direction as the commutator was moved. At the same time the motor rotates gear 21 in the direction that arm 20 was moved by reproducer 11. After the telescope is brought to rest, pin 22 is moved from arm 20 toward its original relation therewith. When the motor has been controlled to reproduce at its particular ratio and with a certain degree of accuracy the movement of the telescope, brushes 39 and 40 are brought in positions to short circuit the commutator segments, whereby armature 50 is again short circuited and the motor brought to rest. Pin 22 is now approximately in diametrical relation with arm 20 and reproducer 11 has driven indicator A accurately into angular agreement with the telescope. It will be observed that due to the relatively great freedom of movement between contact arm 20 and pin 22, the reproducer is free to make the final accurate adjustment of the indicator independently of motor 23.

Under usual conditions of operation, the action of motor 23 is quick enough regardless of the velocity of the telescope to prevent arm 20 from engaging pin 22 as the telescope is moved by the operator. Under such conditions reproducer 11 actuates the indicator independently of the motor. Should, for any reason whatever, reproducer 11 get out of agreement with transmitter 10 by one or more revolutions as would occur, for example, if reproducers 11 and 15 were switched on transmitters 10 and 14 with the indicator considerably out of angular agreement with the telescope, then the indcator, as adjusted by reproducer 11, would have an error equivalent to the number of whole revolutions of the disagreement between reproducer 11 and transmitter 10. This is due to the fact that reproducer 11 snaps into angular agreement with its transmitter only in the particular revolution in which it chances to be without taking into account the number of whole revolutions that it may be out of angular agreement with its transmitter. Reproducer 15, however, due to its 1 : 1 ratio with the telescope, always moves into correct angular agreement with its transmitter and therefore will control motor 23 to rotate gear 21 through the same number of revolutions that reproducer 11 should have made. As gear 21 rotates, pin 22 engages arm 20 each revolution carrying the rotor of reproducer 11 into the next succeeding revolution until the rotor is brought into its correct final revolution in which it moves into angular agreement with its transmitter, thus moving the indicator into positional agreement with the telescope. It will be observed that in effecting this adjustment of the rotor of reproducer 11, pin 22 by engaging arm 20 forcibly moves the rotor through a half only of each revolution to a point where the torque of the reproducer reverses continuing the movement of the rotor into agreement with its transmitter in that revolution. Reproducer 11 is thus caused to repeat the movement applied to its transmitter, whereby indicator A is adjusted accurately into angular agreement with the telescope.

Since each of the reproducers 11 and 15 moves in a direction to take the shortest path into angular agreement with its transmitting device, when the reproducers are connected to the transmitters with the telescope and indicator considerably out of agreement, they may not move in directions corresponding to the movement previously given to the telescope. The indicator, however, is always moved into positional agreement with the telescope.

The angular extent of the sector forming arm 20 is determined by the accuracy with which commutator device 30 controls motor 23. In order that under conditions of maximum lag of gear 21 in either direction the rotor of reproducer 11 will be moved past the point of torque reversal into its correct final revolution, the angular extent of arm 20 must be somewhat greater than twice the maximum possible angular lag in either direction of gear 21 due to inaccuracies in the control of motor 23.

The object in connecting reproducer 15 to drive commutator 30 at half its own speed is to avoid errors in adjustment of the indicator, which would result were the ratio 1 : 1, from the short circuiting of the commutator and consequent stopping of motor 23 when brushes 39 and 40 lag exactly 180 degrees with relation to the commutator. With the brushes and commutator driven at half the speed of reproducer 15, the indicator will be in angular agreement with the telescope whenever the brushes short circuit the commutator.

Obviously our invention may be applied to objects given movement of translation as well as to objects given movement of rotation. In such case the movement of translation of the controlling object may be imparted in terms of rotation to some object, such as an intermediate driving connection, for actuation of the transmitters, while the reproducers may actuate a similar driving connection into angular agreement with the first.

In accordance with the provisions of the patent statutes, we have described the principle of operation of our invention, together with the apparatus which we now consider to represent the best embodiment thereof, but we desire to have it understood that the apparatus shown is only illustrative and that the invention can be carried out by other means.

What we claim as new and desire to secure by Letters Patent of the United States, is:—

1. Means for reproducing position comprising in combination with a controlling object and a driven object, a fine reproducer of angular movement responsive to movement of said controlling object operatively connected to said driven object, and a coarse reproducer responsive to movement of said controlling object for determining the number of whole revolutions of said fine reproducer but leaving it free in a particular revolution to move the driven object into agreement with the controlling object.

2. Means for reproducing position comprising in combination with a controlling object and a driven object, a fine reproducer of angular movement responsive to movement of said controlling object operatively connected to said driven object, a coarse reproducer responsive to movement of said controlling object, and an electric motor controlled by said coarse reproducer operatively connected to said fine reproducer so as to determine the number of whole revolutions of the fine reproducer but leaving it free in a particular revolution to move the driven object into agreement with the controlling object.

3. Means for reproducing position comprising in combination with a controlling object and a driven object, a fine reproducer of angular movement responsive to movement of said controlling object operatively connected to said driven object, a coarse reproducer responsive to movement of said controlling object, an electric motor controlled by said coarse reproducer, and an operative connection between said motor and said fine reproducer permitting limited freedom of movement thereof whereby the motor determines the number of whole revolutions of said fine reproducer in accordance with its ratio with said coarse reproducer but leaves it free in the final revolution to move the driven object into positional agreement with the controlling object.

4. Means for reproducing position comprising in combination with a controlling object and a driven object, a fine reproducer of angular movement responsive to movement of said controlling object operatively connected to said driven object, a coarse reproducer responsive to movement of said controlling object, an electric motor controlled by said coarse reproducer, an arm on the shaft of said fine reproducer, and means driven by said motor cooperating with said arm, whereby the motor determines the number of whole revolutions of said fine reproducer in accordance with its ratio with said coarse reproducer but leaves it free in the final revolution to move the driven object into positional agreement with the controlling object.

In witness whereof, we have hereunto set our hands this 24th day of December, 1921.

EDWARD M. HEWLETT.
WALDO W. WILLARD.